Patented May 23, 1933

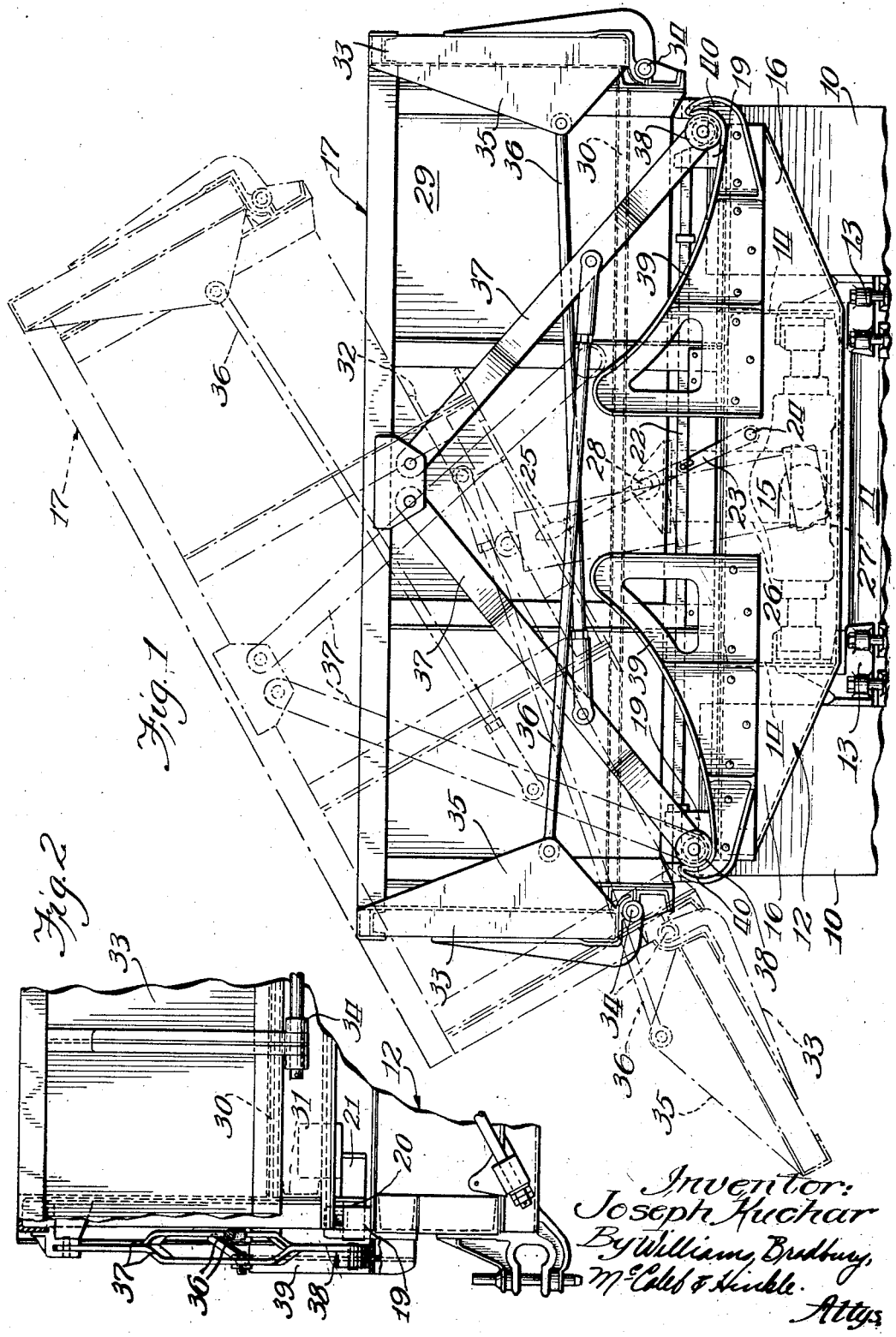

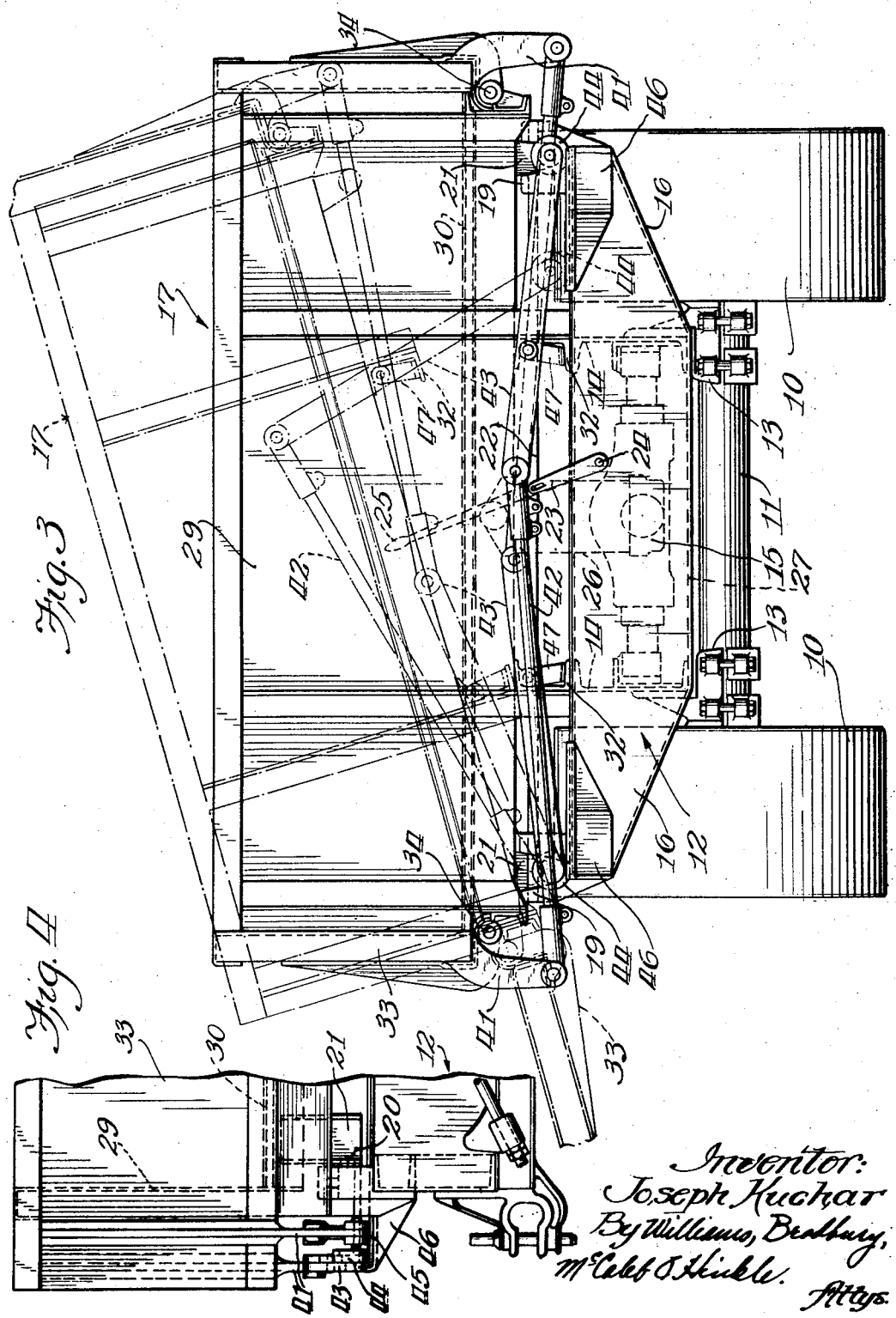

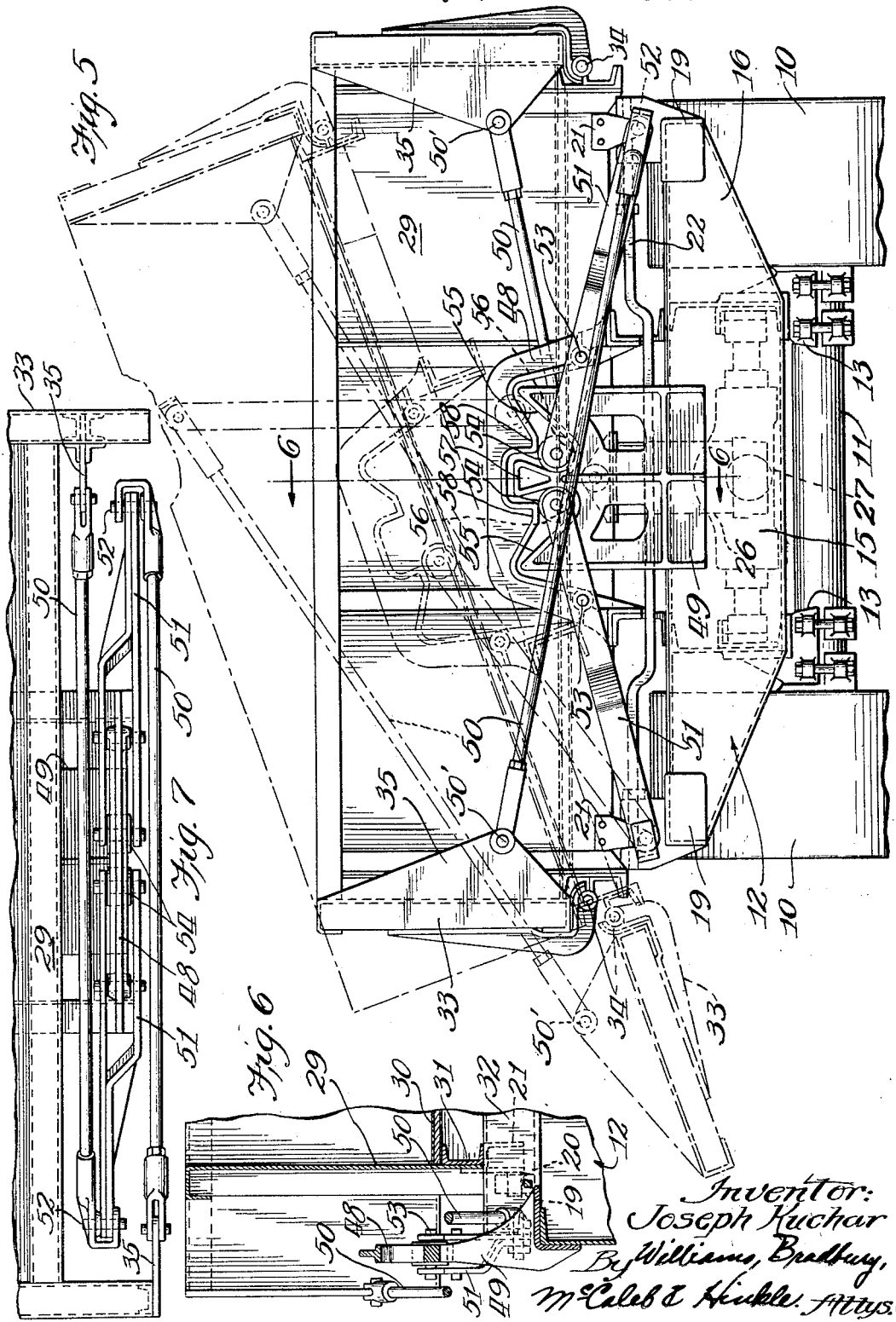

1,909,970

UNITED STATES PATENT OFFICE

JOSEPH KUCHAR, OF CHICAGO, ILLINOIS, ASSIGNOR TO ATHEY TRUSS WHEEL CO., OF CHICAGO, ILLINOIS, A CORPORATION OF ILLINOIS

SIDE DUMP WAGON

Application filed May 6, 1932. Serial No. 609,604.

This invention relates to side dump wagons and particularly to such wagons which are provided with gates which automatically open when the wagon is tilted to dump the load.

One of the objects of the invention is to provide an improved wagon of this type.

A further object of the invention is to provide a dumping wagon having an improved gate opening linkage operable to open a gate when the wagon is tilted in one direction and inoperative when the wagon is tilted in the opposite direction.

A further object of the invention is to provide a dump wagon having gates which automatically open to their fullest extent when the load is tilted through a relatively small angle.

A further object of the invention is to provide a dump wagon having linkages for automatically opening the gates when the wagon is tilted, which are inexpensive to construct, and which are simple, durable and effective in operation.

Other objects, advantages and capabilities of the invention will appear from the following description of preferred embodiments thereof taken in conjunction with the accompanying drawings, in which Figure 1 is an end view of a wagon embodying my invention;

Fig. 2 is a fragmentary side elevational detail view;

Fig. 3 is an end view of a further modification of my invention;

Fig. 4 is a fragmentary side elevational detail view;

Fig. 5 is an end view of a further embodiment of my invention;

Fig. 6 is a transverse sectional detail view taken on the line 6—6 of Fig. 5, and Fig. 7 is a fragmentary plan view showing the linkage at the end of the wagon.

Referring to the drawings, the reference numeral 10 designates the wagon wheels, which may suitably be of the track laying type. These wheels support an axle 11 upon which the wagon frame or chassis 12 is mounted, for example by means of brackets 13.

The frame or chassis 12 comprises two main longitudinal members 14 which may suitably be channels directed inwardly. The rear ends of the channels 14 are connected by a transverse beam or member 15 which extends on either side beyond the channels 14 and provides brackets 16. Similar brackets (not shown) are provided at the forward end of the body 17 in alignment with those shown. It will be understood that the chassis 12 comprises transverse members connecting the channels 14 and other elements which it is thought unnecessary to describe in detail.

Each of the brackets 16 carries a bracket 19 which is provided with a longitudinal recess for the reception of a fulcrum 20 which may be carried by a bracket 21 secured to the underside of the body 17. Each forward and rear pair of brackets 19 is provided with transverse openings above the normal position of the fulcrum 20 and these openings receive transverse sliding bars 22 which have a pin and slot connection with arms 23 which are mounted upon a shaft 24 which extends longitudinally and is mounted on the frame. The shaft 24 carries a lever 25 at its forward end. It will readily be understood that by throwing the lever 25 to the left or right the bars 22 are similarly thrown and lock the fulcrums 20 on the side to which they are thrown and consequently, if the ram 26 is expanded in the usual manner, for example by admission of air or liquid under pressure thereinto, the body will tilt about the fulcrums 20 which are locked in the brackets 21. The ram 26 may be pivotally mounted upon a transverse member 27 carried by the frame and may be pivotally secured to the body at the position 28, preferably substantially in the center of the body.

The body 17 comprises end walls 29 and a bottom 30 which is supported upon a substructure 31, which in turn is supported by longitudinal channels 32 which are adapted to rest upon the upper webs of the channels 14 when the body is in its normal position. The body is provided with side gates 33 which are pivoted adjacent their lower ends by means of pivots 34.

Means are provided whereby the gate on the dumping side is automatically opened when the body is tilted. According to the present invention this means comprises a link connected to the gate and to a second link pivotally mounted on the body, said second link being adapted to co-operate with the body so as to effect or permit the desired movement of the gate relative to the body. Each linkage is provided with a joint or a link end in alignment with the fulcrums 20 on the opposite side of the wagon from the gate to which it is connected. The linkage of the gate on the rising side is consequently unaffected by the tilting movement and said gate remains in its normal closed position. Three embodiments of the invention are disclosed in the accompanying drawings and will now be described.

In the embodiment of the invention illustrated in Figs. 1 and 2 each gate is provided at its end with flanges 35 which extend inwardly on the outer side of the adjacent end of the body. A link 36 is pivotally connected to each web 35 at a point above the pivots 34 of the gates 33. The link 36 extends transversely over the end of the wagon and its other end is pivoted to a lever 37. The lever 37 is pivotally connected to the end of the body near the upper edge thereof and at a point close to the center of the body. Normally it extends obliquely away from the gate to which its associated link 36 is connected. The free end of the lever 37 carries a roll 38 which is normally in alignment with the fulcrum 20 on the side of the wagon remote from the gate to which the linkage is connected.

The cam members 39 are mounted on the bracket 16, these cam members providing surfaces upon which the rolls 38 ride. At their outer edges the cam members 39 are provided with upturned noses 40 which engage the rolls 38 in their outermost position. The cam surfaces extend inwardly and upwardly in the form of a gentle curve which permits the desired opening of the gate on the tilting side, as will hereinafter appear.

The operation of the wagon will readily be understood from a consideration of Fig. 1 in which a second position is shown in dash-dot lines. The full line position shows the normal condition of the body upon the chassis. Assuming the left-hand fulcrums to be locked by throwing the lever 25 to the left and that pressure fluid is supplied to the ram 26, the body elevates about the left-hand fulcrums and the weight of the gate on the left-hand side causes it to tend to open. This tendency is restrained by the engagement of the roll 38 on the right-hand side of Fig. 1 with its cam track. This cam track is so proportioned that it permits the gate to open gradually until the roll 38 reaches its dash-dot position at the top of the track. The cam track is preferably proportioned so that this condition arises after the body has elevated through about 15 degrees. At this time the gate 33 on the left-hand side abuts against the body and is held in alignment with the floor of the body. Further relative movement between the left-hand gate 33 and the body is thereby prevented during the remainder of the dumping movement. As the dumping continues, for example through a total angle of about 60 degrees, the roll 38 elevates out of contact with the cam member 39 and moves freely with the body.

After the load is dumped the ram 26 is allowed to collapse. When the collapse has allowed the body to return to its position of 15 degrees elevation, the roll 38 engages the cam track of the cam member 39 and during the rest of the return movement the lever 37 is moved by the cam track in a counterclockwise direction so that when the return movement is complete the left-hand gate 33 is closed. During the dumping operation described the left-hand roll 38, connected to the right-hand gate 33, is maintained in a stationary position by the nose 40 of the left-hand cam member 39 and consequently the right-hand gate 33 does not move.

In the embodiment of the invention illustrated in Figs. 3 and 4 the gates 33 are provided at each end with arms 41 which extend downwardly below pivots 34 of the gates. Each arm 41 is pivotally connected to a link 42, which is pivotally connected to a lever 43. The lever 43 is pivotally mounted at an intermediate point upon the body 17 and in normal position extends obliquely away from the link 42 to which it is attached, the link 42 and lever 43 inclining upwardly towards their common pivot. The levers 43 may suitably be mounted on the body 17 by means of brackets 47 which project outwardly from the channels 32 and extend upwardly so as to provide pivotal support for the levers 43 without fouling the links 42. The end of the lever 43 remote from the common pivot carries a roller 44 which is normally in alignment with the fulcrums 20 remote from the gate 33 to which the linkage described is attached. The roller 44 rides on the surface 45 of a bracket 46. The brackets 46 may suitably be carried upon the brackets 16. It will readily be understood that the surface 45 is of sufficient length to provide the full degree of movement required by the roller 44.

In operation it will readily be understood that when the body is tilted to the left, in the manner described in connection with the previously described embodiment of the invention, the weight of the left-hand gate, as viewed in Fig. 3, causes same to tend to open, which tendency causes the roller 44 on the right-hand side to exert a pressure on the surface 45. As the body rises the clearance between the surface 45 and the intermediate pivot of the lever 43, increases and this lever is enabled to move towards the vertical position, the roller 44 meanwhile traveling to the left. The gate 33 is adapted to open freely after the body has tilted through an angle of approximately 15 degrees. At this point the gate contacts with the substructure of the body and remains in alignment with the floor. With the continuing elevation of the body the roller 44 is elevated out of contact with the surface 45 and moves freely through the air during the remainder of the dumping movement, which may have a total extent of about 60 degrees. When the body is allowed to return to its initial position the roller 44 makes a contact with the surface 45 when the elevation of the body has diminished to about 15 degrees. During the remainder of the return movement the roller 44 is caused to move toward the right until, at the end of the return movement it occupies the position shown in full lines in Fig. 3, the gate having consequently been moved to closed position. It will readily be understood that during this dumping and return movement the gate on the right-hand side is unaffected since its roller 44 is in alignment with the active fulcrums 20 on the left-hand side of the wagon. As a consequence of this the link 42 and the lever 43 associated with the right-hand gate are uninfluenced by the movement just described.

In the embodiment of the invention illustrated in Figs. 5, 6, and 7, the beams 32 extend beyond the end walls 29 of the body and the lower portions of the projecting ends are cut away so as to provide clearance for the bars 22, the intermediate portions of which are displaced downwardly as shown in Fig. 5. Upon the projecting portions of the beam 32 is mounted an inverted U bridge piece 48 which will be further described. A cam member 49 is mounted on the chassis, for example on the transverse beam 15 symmetrically about the center of the wagon and in the same plane as the bridge piece 48, said cam member providing a pair of cam surfaces which will hereinafter be described.

The side gates 33 are provided with end flanges 35 to which are pivoted links 50, at points 50' above the hinge axes 34 of the gates. The links 50 extend obliquely across the end wall of the body and are pivotally connected to forked links 51 at points 52 normally in alignment with the fulcrums 20. The bifurcated links 51 receive between their legs the bridge piece 48 to which they are pivotally connected at points 53 intermediate their lengths. At their innermost ends the links 51 carry between their legs rollers 54. As will readily be seen from Figs. 5 and 7 the links 51 are inwardly directed from their pivotal connection with the links 50 and in their normal relation approach each other, the rollers 54 being located upon the cam surfaces of the cam member 49.

The cam member 49 may suitably be in the form of casting, reinforced by suitable webs. Each cam surface which is designated 55 extends inwardly and downwardly and gives into a recess 56 which is adapted to receive the roller 54. The recess 56 is overhung by the upward continuation of the cam surface which provides a central head 57. The bridge member 48 is provided with downwardly projecting noses 58 which engage the rollers 54 in the normal position of the body. As will readily be seen in Fig. 7 the links 50 are spaced one on each side of the cam member 49 and bridge member 48 so that their movements are not impeded thereby. The bifurcated levers 51 being located one on each side of the center line of the body have the desired freedom of movement.

It will be noted in Fig. 5 that when the gates are closed the link 50 lies below the pivot point 53. When the body is tilted to the left the right-hand roller 54, which is associated with the left-hand gate, tends to move upwardly with the body but is prevented from doing so by the head 57. Consequently the pivot point 52 is moved into and past the line joining the point 50' to the point 53, that is past the line of centers, and the weight of the left-hand gate 33 tends to move it to the open position. This causes a downward pressure of the roller 54 upon this cam surface 55. As the body elevates the pivot 53 moves with it and the roller 54 follows the cam surface 55 until the position indicated in dash-dot lines is attained. At this position the left-hand gate 33 goes into alignment with the floor and into abutment with the body. This condition is preferably attained when the body is elevated through a relatively small angle, for example about 15 degrees. Further elevation of the body causes the roller 54 to rise away from its cam surface 55 and moves through the air until the completion of the tilting movement, which may, for example, occupy 60 degrees.

When the body is lowered the right-hand roller 54, that is the roller associated with the left-hand gate 33, moves through the air until the elevation of the body is reduced to about 15 degrees, whereupon it strikes its cam surface 55, along which it rides closing the left-hand gate 33. The cam roller 54 is thereby brought into its recess 56 at which time the pivot points 50', 53 and 52 are in substantial alignment. After this the right-hand side of the body moves downwards bringing the pivot 52 below the line joining the pivots 50' and 53 so that the left-hand gate 33 is securely locked until the next dumping operation.

During this dumping and return movement the right-hand gate 33 is unaffected, since the joint 52 of the linkage associated with this gate is in alignment with the active pivots 20. It will readily be seen that this linkage moves with the body, the left-hand roller 54 being adapted to move freely out of the recess 56 when the body is tilted about the left-hand fulcrums 20, the shape of the overhanging portion of the head 57 being adapted to permit this movement. Any tendency for the right-hand gate to open in these circumstances is prevented by the nose 58 of the bridge member 48. The nose 58 also takes the upward thrust of the roller 54 during normal loaded position, since any force tending to open the gate causes an upward force on the roller 54 which is taken by the nose 58.

Although the invention has been described in connection with specific details of preferred embodiments thereof, it must be understood that such details are not intended to be limitative of the invention except insofar as set forth in the accompanying claims.

Having thus described my invention, what I claim as new and desire to secure by Letters Patent of the United States is:

1. A dump wagon comprising a chassis, a body pivotally mounted thereon and adapted to dump to either side about spaced fulcrums, a gate on each side of the body pivoted thereon adjacent its lower edge, a link connected to each gate, a lever pivotally connected to each link, said lever being pivoted to the body, said lever having an end normally in alignment with the fulcrum remote from the gate to which it is attached and said lever being adapted to engage a cam surface on the frame so as to permit the gate on the side to which the body is tilted to open.

2. A wagon comprising a chassis, a body mounted thereon and adapted to dump to either side about spaced fulcrums, a gate pivotally mounted on each side adjacent its lower edge, a link pivotally connected to each gate, a lever pivotally mounted on the body and pivotally connected to said link, said lever having an end normally in alignment with the fulcrum remote from the gate with which it is associated, and cams on the chassis adapted to cooperate with said levers so as to permit the gate to open completely during the initial portion of the tilting operation, the lever being adapted to move with the body during the remainder of the tilting movement.

3. A side dump wagon comprising a chassis, a body mounted thereon adapted to tilt towards either side about spaced fulcrums, a gate on each side pivotally mounted adjacent its lower edge, a link pivotally connected to said gate above its pivotal point, a lever pivotally mounted on the body and pivotally connected to said link, the lever having a free end normally in alignment with the fulcrum on the side remote from the gate to which it is attached, said free end being adapted to cooperate with the surface on the chassis so as to permit the gate to open fully in approximately the first 15 degrees of the tilt, the linkage being thereafter adapted to elevate without motion relative to the body during the remainder of the tilting movement.

4. A side dump wagon comprising a chassis, a body mounted thereon adapted to tilt to either side about spaced fulcrums, a gate on each side of the body pivoted thereon adjacent its lower edge, a link pivotally connected to each gate and a lever pivotally mounted on the body and pivotally connected to said link, the common joint of said link and lever being normally in alignment with the fulcrum remote from the gate to which said link is attached, the free end of said lever being adapted to cooperate with the chassis so as to permit said gate to open completely during the initial part of the tilting movement, the linkage being adapted to move with the body without relative movement thereto during the remainder of the tilting operation.

5. A side dump wagon comprising a chassis, a body mounted thereon and adapted to tilt to either side about spaced fulcrums, a gate on each side of the body pivoted thereon adjacent its lower edge, a link pivotally connected to each gate and a lever pivotally mounted on the body and pivoted to said link, means on the chassis adapted to cooperate with said lever so as to bring the common pivot point of the link and lever past the line of centers of the pivot of the link with the gate and the pivot of the lever on the body, said common pivot being normally located in alignment with the fulcrum remote from the gate to which the linkage is attached.

6. A side dump wagon comprising a chassis, a body mounted thereon and adapted to tilt to either side about spaced fulcrums, a gate on each side of the body pivoted thereon adjacent its lower edge, a link pivotally connected to each gate and a lever pivotally mounted on the body and pivoted to said link, means on the chassis adapted to cooperate with said lever so as to bring the common pivot point of the link and lever past the line of centers of the pivot of the link with the gate and the pivot of the lever on the body, said common pivot being normally located in alignment with the fulcrum remote from the gate to which the linkage is attached, said means on the chassis comprising an overhanging element adapted to engage the lever remote from the pivoting fulcrum so as to release the gate adjacent said fulcrum.

7. A side dump wagon comprising a chassis, a body mounted thereon and adapted to tilt to either side about spaced fulcrums, a gate on each side of the body pivoted thereon adjacent its lower edge, a link pivotally connected to each gate and a lever pivotally mounted on the body and pivoted to said link, means on the chassis adapted to cooperate with said lever so as to bring the common pivot point of the link and lever past the line of centers of the pivot of the link with the gate and the pivot of the lever on the body, said common pivot being normally located in alignment with the fulcrum remote from the gate to which the linkage is attached, said means on the chassis comprising an overhanging element adapted to engage the lever remote from the pivoting fulcrum so as to release the gate adjacent said fulcrum, said overhanging means being adapted to permit the lever associated with the opposite gate to elevate freely with the body.

8. A side dump wagon comprising a chassis, a body mounted thereon adapted to tilt to either side about spaced fulcrums, a gate on each side of the body pivotally mounted thereon adjacent its lower edge, a link pivotally connected to each gate above its pivotal axis adapted normally to extend across the end of the body into alignment with the fulcrum remote from gate to which the link is attached, a lever pivotally connected to said link and pivotally carried by the body, a cam member carried by the chassis adapted to cooperate with a pair of levers at one end of the body, the links at each end of the body being located on either side of said cam member.

9. A side dump wagon comprising a chassis, a body mounted thereon adapted to tilt to either side about spaced fulcrums, a gate on each side of the body pivotally mounted thereon adjacent its lower edge, a link pivotally connected to each gate above its pivotal axis adapted normally to extend across the end of the body into alignment with the fulcrum remote from gate to which the link is attached, a lever pivotally connected to said link and pivotally carried by the body, a cam member carried by the chassis adapted to cooperate with a pair of levers at one end of the body, the links at each end of the body being located on either side of said cam member, and means carried by the body adapted to cooperate with said levers.

10. A side dump wagon comprising a chassis, a body mounted thereon adapted to tilt to either side about spaced fulcrums, a gate on each side of the body pivotally mounted thereon adjacent its lower edge, a link pivotally connected to each gate above its pivotal axis adapted normally to extend across the end of the body into alignment with the fulcrum remote from gate to which the link is attached, a lever pivotally connected to said link and pivotally carried by the body, a cam member carried by the chassis adapted to cooperate with a pair of levers at one end of the body, the links at each end of the body being located on either side of said cam member, and means carried by the body in the plane of said cam member adapted to engage the free ends of said levers.

11. A side dump wagon comprising a chassis, a body mounted thereon and adapted to tilt to either side about spaced fulcrums a gate on each side of the body pivotally mounted thereon adjacent its lower edge, an arm extending downwardly from the gate, a link pivotally connected to said arm and extending inwardly, a lever pivotally mounted on the body and pivotally mounted to said link, the link and lever normally being directed upwardly slightly and being directed away from each other, the free end of the lever normally being located in alignment with the fulcrum remote from the gate to which the linkage is attached, said remote end of the lever being adapted to cooperate with the surface of the chassis to permit rapid opening of the gate on the tilting side during the initial part of tilting, the lever being thereafter adapted to elevate out of contact with the chassis during the remainder of the opening movement.

In witness whereof, I hereunto subscribe my name this 4th day of May, 1932.

JOSEPH KUCHAR.